Patented Apr. 21, 1942

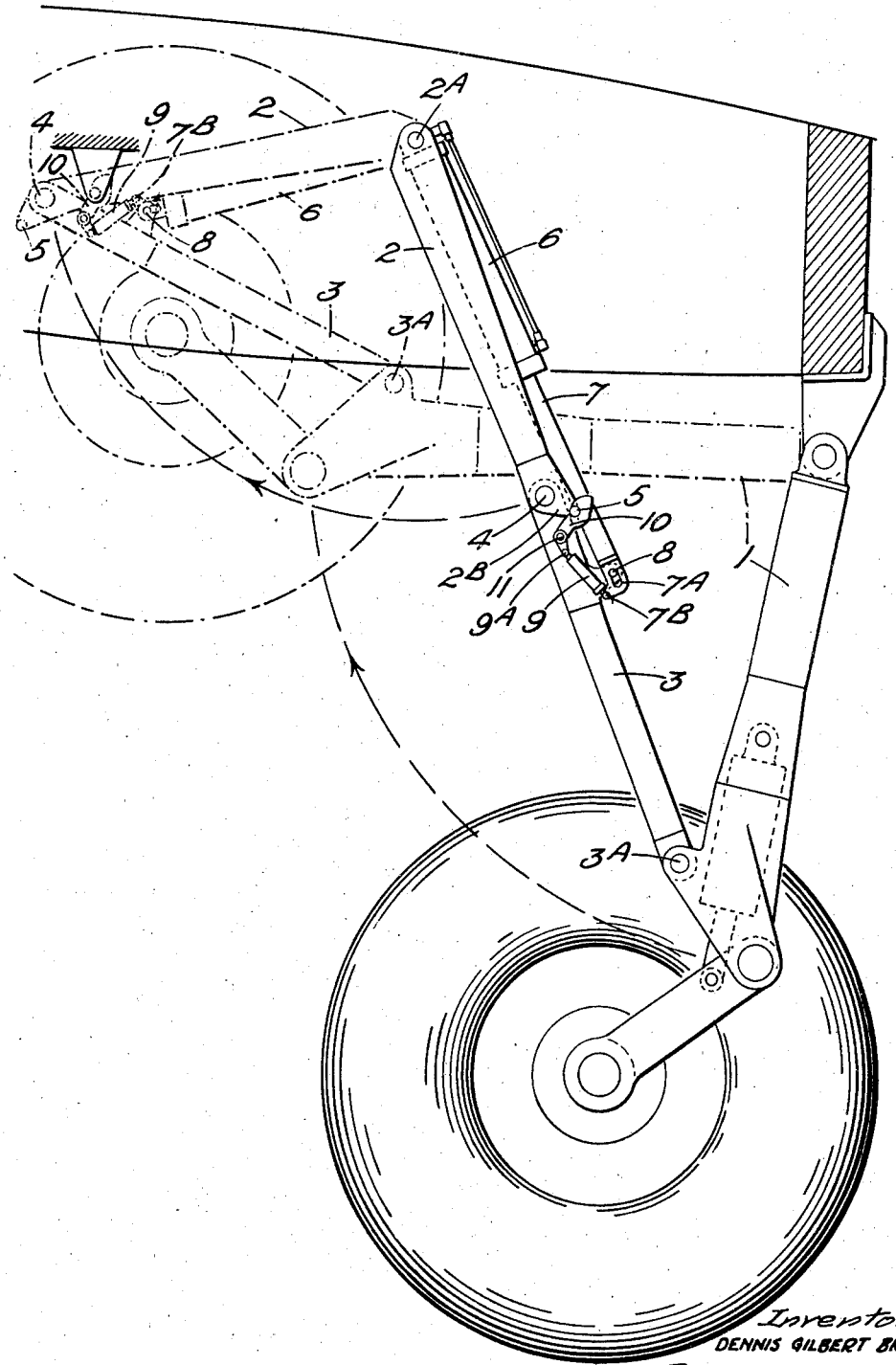

2,280,185

UNITED STATES PATENT OFFICE 2,280,185

RETRACTABLE UNDERCARRIAGE FOR AIRCRAFT AND LOCKING MEANS THEREFOR

Dennis Gilbert Bridges, Cheltenham, England, assignor to Dowty Equipment Limited, Cheltenham, England Application April 22, 1940, Serial No. 330,958
In Great Britain June 17, 1939

12 Claims. (Cl. 244—102)

This invention relates to the locking, operation, and arrangement, of retractable aircraft undercarriages or landing gear such as tail or nose wheels, deemed to be included in the term "undercarriages."

An object of the invention is to provide simple and effective locking means for both up and down positions of a retractable undercarriage. Another object is to provide locking means with a minimum number of working parts, economical both as to weight and cost.

Another object is to ensure that whilst undercarriage locking shall be definite and certain, unlocking must always precede the imposition of any or any substantial force by the actuating means (e. g. jack) of the undercarriage.

Yet another object is to provide an undercarriage which, complete with its locking and operative means, has a very simple mode of attachment to the aircraft and can readily be attached or detached as a complete unit.

The accompanying diagrammatic drawing illustrates the invention by way of example. It shows a side elevation of all parts necessary for an understanding of the construction, the full line showing the undercarriage extended and locked down, whilst the broken line shows it retracted and locked up.

The main structure of the undercarriage consists of a pivotally mounted leg 1 and a breakable strut in two parts, the upper part 2 and the lower part 3. These parts 2, 3, are respectively pivotally connected to the aircraft at 2A, and to the leg 1 at 3A, and they are pivotally interconnected at 4, this joint being in the nature of a knuckle-joint allowing "breaking" in one sense only. The part 2 has a lug extension 2B carrying a down-locking detent 5. The aircraft carries an up-locking detent on a suitable fitting.

The leg 1 has at its lower end a pin-jointed wheel-carrying lever, the movements of which are restrained by a shock-absorber partly housed within the leg. It is to be understood that, following common practice, the leg and the breakable strut are formed by plane-frames, for example rigid structures comprising parallel main members and cross-bracing, and the jack, locking parts, et cetera, may be accommodated between the main members, and may be duplicated side by side. Upon the same axis as the joint 2A and preferably upon the pin of that joint, is borne the cylinder 6 of a double-acting retraction jack, which has a ram or rod 7. The rod 7 has a slot 7A at its extremity, in which is engaged a pin 8 mounted on a laterally-offset lug of the strut part 3. This forms a lost-motion connection such that when the jack contracts its initial movement is lost but thereafter it breaks the strut, causing relative angular movement of the parts 2, 3, about the joint 4, and thus breaking the strut and retracting the undercarriage. It should be noted that during retraction the jack as a whole moves relatively to the part 3 through a wide angle.

The jack rod 7 has a somewhat offset pin-joint connection at 7B to a link 9, which is again connected pivotally at 9A to a latch 10. The latch is, in effect, a slightly cranked lever, and it is pivotally carried at 11 on the strut part 3. The latch has a single lateral notch (seen engaged on the detent 5) and is profiled so that the detents can force it aside as it approaches the locking position in the movement of the undercarriage. The link 9 is extensible against a spring contained within itself, but is positive in compression.

A comparison of the two positions shown makes the action clear. For retraction, the lost-motion of the jack, setting up thrust in the link 9, rocks the latch 10, positively disengaging it from the detent 5, prior to the jack applying any or any substantial force in the undercarriage structure. As retraction movement proceeds, the angular movement of the jack relative to the part 3 is transmitted to the latch 10 by the link 9 until an entirely new position is taken up by the latch, in which it registers with the detent 6. As it contacts this detent the latch is urged aside against the tensile resilient resistance of the link 9 until finally the latch "clicks" into up-locking engagement with the detent. The undercarriage is now locked up. For extension, the operation of the jack is reversed so that it starts to extend. Initially, it has the lost-motion due to the slot 7A, and so thrusts in the link 9, thereby releasing the latch from the detent. Thereafter extension proceeds, during which the latch is returned to the position in which it is ready to "click" into engagement with detent 5 for down-locking, first riding against—and being forced back by—the detent as the undercarriage approaches its extended position.

It is obvious that the precise geometrical arrangement may be considerably varied. For example, the jack cylinder may be pivotally attached to the aircraft upon some axis other than at 2A. The described arrangement however has the merit that it affords a self-contained undercarriage which requires only two attachments to the aircraft (except for that of the detent). Where reference is made to the notch of the latch, it is to be understood that it may take various forms, providing it is in the nature of a recess, claw, or equivalent, capable of being entered by, and therefore engaging, the detents, in a manner satisfactory for locking purposes.

The invention is to be distinguished from a previously published proposal of mine, to employ a pivotal latch element in a retractable undercarriage, which latch element was operated by lost-motion of a double-acting operating jack, and in which the latch element had two notches facing in opposite directions (and on opposite sides of the pivot) one of which engaged a "down" detent and the other an "up" detent, by virtue of which arrangement the construction was less simple, light, and economical.

What I claim is:

1. Locking means for a retractable aircraft undercarriage, comprising a first detent for down locking, a second detent for up locking, and a singly notched latch element adapted to engage either detent alternatively by latch-movement in the same sense.

2. In a retractable aircraft undercarriage, locking means comprising a first detent for down locking, a second detent for up locking, a singly notched latch element adapted to engage either detent alternatively by latch-movement in the same sense, resilient means to urge said latch element in said sense and means positively to disengage the latch element from the respective detents prior to the application of force for retraction or extension respectively.

3. In a retractable aircraft undercarriage a double-acting operating jack, a lost-motion connection between the jack and the undercarriage structure to be operated thereby, a singly notched latch element movably carried by a part of the undercarriage structure, a first detent for down locking, a second detent for up locking, and a connection between the jack and the latch element adapted to move the latter from engagement with either detent with which it may be engaged, prior to movement of the undercarriage by the jack in the respective sense and during lost-motion travel of the jack, such disengagement movement being in each case in the same sense.

4. In a retractable aircraft undercarriage, a first detent for down locking, a second detent for up locking, a latch element pivotally carried by the undercarriage structure and singly notched to engage down and up locking detents alternatively, by movement about its pivot in the same sense.

5. In a retractable aircraft undercarriage, a double acting operating jack, a breakable strut, and a swingable leg, a lost-motion and pivotal connection between the jack and a part of said strut through which said jack effects retraction and extension, a singly notched latch element pivotally carried by said strut part, a first detent carried by the other strut part for "down" engagement by said latch element, a second detent located for "up" engagement thereby, and a connection between said jack and said latch element whereby lost-motion travel of the jack preceding either operation of the undercarriage positively causes disengagement of said latch element from the detent which is then engaged.

6. In a retractable undercarriage according to claim 5, the provision of a telescopic link in said jack and latch connection, adapted to yield against resilience in one sense and to form a positive connection in the other sense.

7. In a retractable undercarriage according to claim 5, a connection between the jack and strut part and between the jack and latch element such that angular relative movement between the jack and strut part occurring during undercarriage operation, changes the position of the latch element appropriately for engagement with the respective detent.

8. An aircraft, an undercarriage leg structure pivotally attached thereto, a breakable strut comprising a first part pivotally attached to the aircraft spaced from the leg structure and a second part pivotally attached to the leg structure and to said first part at a knuckle joint, a double acting jack pivotally attached to the aircraft, a lost-motion pivoted connection between the jack and said second strut part, a singly notched latch element pivotally carried by said second strut part, a down-locking detent carried by said first strut part for engagement by the notch of said latch element, an up-locking detent carried by the aircraft structure for alternative engagement by said notch, and a connection between said jack and said latch element adapted to move the latch element between two detent-engaging positions during operation of the undercarriage by virtue of relative angular jack movement and also to resiliently urge the latch element towards detent engagement, said connection comprising a link which is extensible against resilience and positively resists compression.

9. The combination of claim 8, further comprising the feature that the connection between the jack and the aircraft is co-pivotal with that of the pivot strut part.

10. A retractable aircraft undercarriage having a locking mechanism comprising a detent carried by the undercarriage for down locking, a detent carried by the aircraft for up locking, a singly notched latch element pivotally carried upon said undercarriage, an operating jack for retracting the undercarriage having a lost motion connection therewith, and a resilient link interconnecting said latch element with said lost motion connection to disengage the latch element from the respective detents prior to the applicaion of force to the undercarriage by the jack for retraction or extension thereof.

11. A retractable undercarriage for an aircraft having a locking means comprising a detent for down locking, a detent for up locking, a singly notched latch element pivotally carried upon the undercarriage for alternatively engaging said detents for extension or retraction of the undercarriage, means for retracting the undercarriage, a lost motion connection between said undercarriage and said retracting means, resilient means interconnecting said lost motion connection with said latch element, said resilient means transmitting motion from said retracting means to positively disengage the latch element from the respective detents prior to the application of force for retraction or extension, and providing resilient pressure upon said latch element to snap the same in place upon the respective detents when the undercarriage is fully retracted or extended.

12. In a retractable undercarriage a supporting leg for a landing element of an aircraft, a two-part strut for retracting and extending said leg, a detent carried by one of said strut parts for down locking the undercarriage, a detent carried by the aircraft for up locking, a singly notched latch element pivotally carried by the other of said strut parts, means for retracting the undercarriage having a lost motion connection with the last mentioned strut part, and means interconnecting said lost motion connection with said latch element for positively disengaging said latch element from the respective detents prior to retraction or extension of the undercarriage.

DENNIS GILBERT BRIDGES.